INVENTOR.
EDWARD CHARLES KEHOE

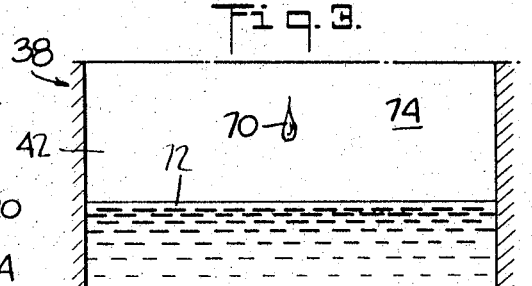
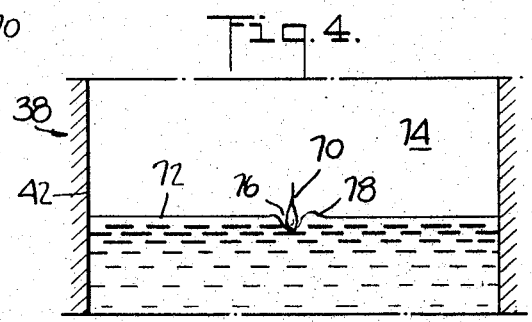
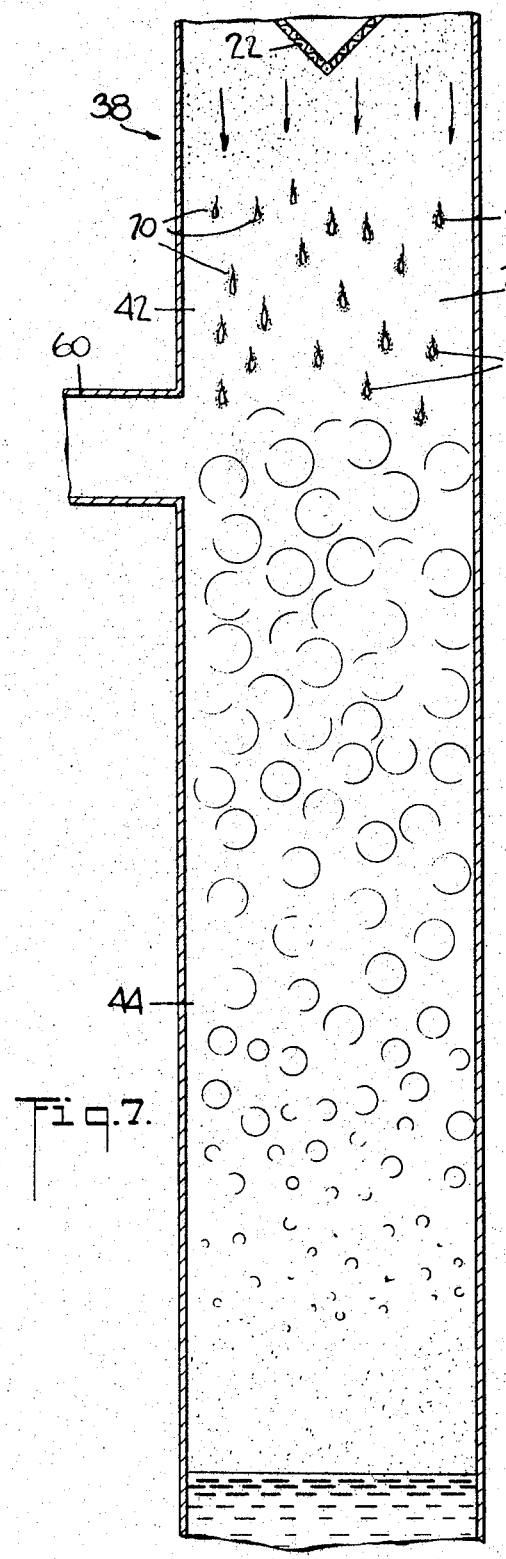
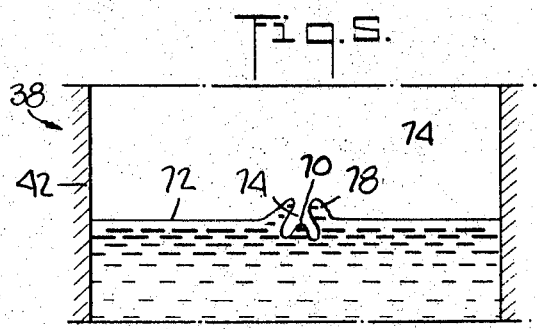
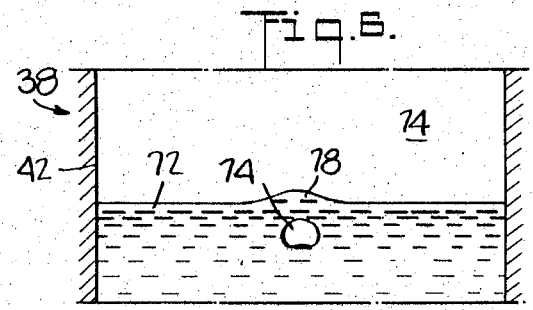

3,454,471
VAPOR CONDENSATION SYSTEM
Edward Charles Kehoe, North Caldwell, N.J., assignor, by mesne assignments, to Saline Water Conversion Corporation, Dradell, N.J., a corporation of New York
Filed May 10, 1966, Ser. No. 549,068
Int. Cl. C02b *1/04;* B01d *3/14*
U.S. Cl. 203—42                                6 Claims

ABSTRACT OF THE DISCLOSURE

Systems for effecting condensation of vapors by injecting the vapors into a liquid at a point of relatively low pressure and advancing the liquid in such a manner as to carry the vapor along in the form of bubbles to a region of higher pressure whereupon the vapor bubbles become compressed to a point such that the vapor liquifies.

---

This invention relates to liquid-vapor systems and more particularly it concerns a novel condensation system for use in solvent recovery operations.

The present invention is especially suited for use in connection with solvent recovery operations utilizing evaporative fractionation techniques. In carrying out such operations a solution, such as sea water is fractionated or separated (at least partially) into its fresh water component and into saline components, by evaporating and thereupon separating the fresh water components. The separated fresh water component or solvent, is thereafter recovered by reliquefication or condensation.

The evaporation of the fresh water component is obtained by injecting into it a certain amount of heat, i.e., its heat of vaporization. Therefore, in order to effect condensation of the vapor, this heat of vaporization must be extracted. This extraction is achieved in conventional systems by use of a coolant fluid which is passed along the vapor in heat exchange relationship therewith. In another system, known as the Kleinschmidt vapor compression distilling system, the vapor is compressed prior to cooling. This compression raises the temperature of the vapor so that its heat of vaporization will more readily pass into the coolant liquid.

In the present invention, the heat of vaporization of the vapor to be condensed is extracted in a novel manner. That is, the vapor undergoes gradual compression and simultaneous gradual cooling so that there is a smooth and continuous extraction of heat from the vapor and a thermodynamically efficient condensation thereof. Moreover, the entire heat of vaporization is recovered in the present invention, and where the system is continuous, this heat may be utilized in a very efficient manner.

According to the present invention a vapor such as steam, is condensed by causing a carrier fluid, such as liquid water, to pass from a first region, where the pressure is at or below the vapor pressure of the vapor, to a second region, where the pressure is above the vapor pressure of the vapor. The vapor or steam is ingested, or caused to be entrapped in bubble formation by the carrier liquid in the first region, and it is carried along by the liquid toward the second region. The increasing pressure of the carrier liquid, serves to compress the vapor incrementally as it moves along toward the higher pressure region. This compression causes the vapor temperature to rise incrementally, and as this occurs, the slightly higher temperature vapor loses heat to the lower temperature water. This heat transfer, of course, is also gradual and therefore quite efficient from a thermodynamic standpoint. In fact, it has been found that with this arrangement it is possible to obtain about twice the normal heat transfer for a given quantity of liquid at given temperature conditions. Eventually, the vapor becomes fully condensed.

In an illustrative embodiment there is provided a vertical column into the top of which a liquid is sprayed, and out from the bottom of which liquid is drawn. The rate of liquid insertion and extraction is such as to produce a rapid flow down through the column, and at the same time to maintain a head within the column, from the bottom thereof to a region near its top. The liquid sprayed into the top is near its vaporization point. Steam at the same temperature and also near its vaporization point is injected into the column in the path of the liquid spray. The spray engulfs the steam and entraps it in bubble formation within the downwardly moving liquid in the column. As the steam bubbles are carried downward, they are squeezed and compressed by the higher pressure of the liquid toward the bottom of the column. This pressure raises the temperature of the vapor in the bubbles; and the heated vapor in turn loses heat to the surrounding water. Eventually the vapor condenses and the bubbles disappear. Because these changes take place incrementally they are essentially isothermal and therefore quite efficient.

The present invention further comprehends a saline water conversion system wherein there is provided an evaporator from the bottom of which vapor is taken and ingested into a fresh water column as above described. The fresh water in absorbing heat of vaporization from the vapor, is raised in temperature. This absorbed heat is recovered from the fresh water by passing it in heat exchange relationship with saline water going into the evaporator. Excess fresh water produced by this vapor condensation is then drawn off while the remainder is passed through a secondary evaporator above the liquid column. This secondary evaporator brings the fresh water to a temperature-pressure condition close to that of the ingested steam, before it is sprayed into the column.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and are shown in the accompanying drawings, forming a part of the specification, wherein.

Figure 1:
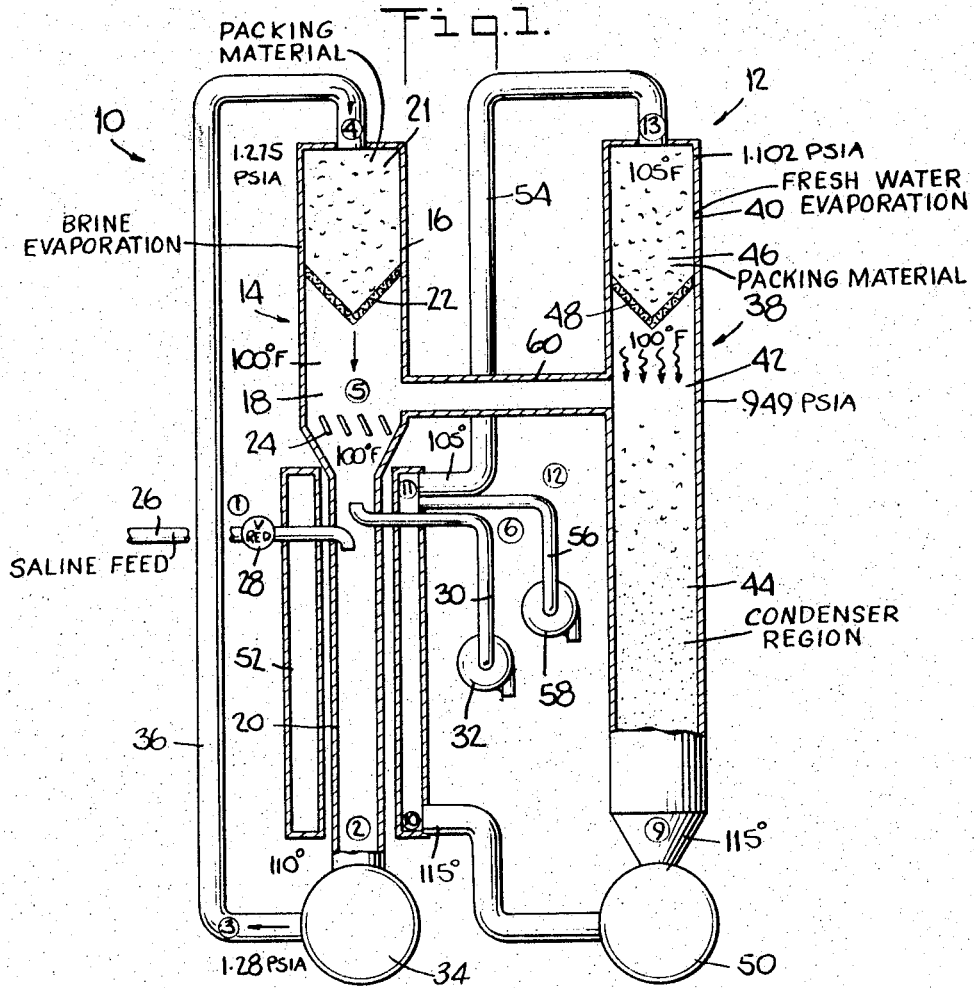
FIG. 1 is a schematic representation of a solvent recovery system embodying the present invention.

FIGS. 3–6 inclusive are enlarged fragmentary views of a portion of the system of FIG. 1 showing in stylized manner a portion of a vapor ingestion process as obtained by the present invention; and FIG. 7 is a further enlarged fragmentary view of a larger portion of the system of FIG. 1 and illustrating the overall vapor ingestion process obtained by the present invention.

The solvent recovery system shown in FIG. 1 is designed to extract fresh water from a saline solution such as sea water.

This solvent recovery system comprises two separate recirculating loops shown generally at 10 and 12 and designated respectively as a saline water loop and a fresh water loop. The saline water loop 10 includes a tubular column 14, divided into an upper evaporator region 16, an intermediate vapor region 18 and a lower heat recovery region 20. The upper evaporator region 16 serves to produce a diffused or gradual evaporation of water flowing down through it. The manner in which such gradual evaporation takes place is discussed in U.S. Patents 3,214,349 and 3,214,350. In the illustrative arrangement employed herein, the region 16 contains a myriad of closed passageways through which the water passes while undergoing partial evaporation. These passageways may be formed by packing the region with rubble or broken crockery 21. A screen or grating 22 holds the packing material in the upper portion of the column 14 and separates it from the vapor region 18. A plurality of baffle plates 24 are positioned in the lower portion of the vapor region. These baffle plates are slanted and they serve to break the fall of liquid water down through the vapor region so that it moves relatively slowly and with a minimum of turbulence down into the heat recovery region 20.

A saline intake conduit 26 leads into the upper portion of the heat recovery region 20. This intake conduit 26 is provided with a pressure reduction orifice 28 through which incoming saline water must pass with a consequent loss of pressure in moving into the system. A saline water discharge conduit 30 is provided to expel saline water from the saline water loop 10 at a point near the intake conduit 26. A saline discharge pump 32 is connected to the discharge conduit 30 and is used to pump the outgoing liquid back up to atmospheric pressure so that it may effectively be discharged.

A saline water recirculating pump 34 is located at the lower end of the column 14 and serves to pump water from the bottom of the column, up through a saline water return line 36 back to the top of the column, thus completing the saline recirculating loop 10.

The fresh water recirculating loop 12 also includes an upright column 38. This column is divided into an upper fresh water evaporator region 40, an intermediate ingestor region 42 and a lower condenser region 44. The upper fresh water evaporator region 40, like the evaporator region 16 operates in a manner described in U.S. Patents 3,214,349 and 3,214,350 to produce gradual evaporation of the water flowing down through it. The region 40, like the region 16, is made up of packing material 46 supported in the upper portion of the column 38 by means of a screen or grate 48.

A fresh water recirculating pump 50 is located at the bottom of the column 38, and pumps water from the bottom of the column into the lower end of a counterflow heat exchange jacket 52. The heat exchange jacket surrounds the heat recovery region 20 of the column 14 in the saline water loop 10; and it serves to transfer heat into the saline water passing down through the column 14. A fresh water return line 54 conveys water from the upper portion of the heat exchange jacket 52 to the top of the column 38 thus completing the fresh water loop 12.

A fresh water discharge line 56 is also converted into the upper portion of the heat exchange jacket 52. A fresh water discharge pump 58 is located in the fresh water discharge line 56 and serves to pump fresh water from the loop 12 up to atmospheric pressure so that it may effectively be recovered.

A vapor transfer conduit 60 interconnects the saline water and fresh water loops 10 and 12 and extends between the vapor region 18 in the saline water loop and the ingestor region 42 in the fresh water loop.

As indicated above, the evaporation regions 16 and 40 in the two recirculating loops 10 and 12 both operate in the manner of the evaporators described in U.S. Patents 3,214,349 and 3,214,350. In such evaporators water in liquid form is supplied at the top under conditions of pressure and temperature such as it is at or close to its vaporization point. The water then flows down through the packing material in the evaporator, becoming dispersed into a plurality of separate streams, each flowing in an enclosed channel. The pressure at the bottom of the evaporator is maintained below that at the upper end so that a portion of the water evaporates as it flows downwardly. The heat of vaporization is obtained from the unevaporated portion, thus lowering its temperature. Because rather large amounts of heat are needed for vaporization purposes only a small percentage of the water actually becomes vaporized. However, the volume of even this small percentage is far in excess of the unevaporated portion. This has the effect of "choking-up" the evaporator by the downward rush of vapor toward its lower, low pressure end. This "choking-up" serves to produce a distributed pressure gradient along the length of the evaporator so that evaporation takes place smoothly and continuously as water flows down through it.

During operation of the system, saline water, such as sea water is admitted via the saline intake conduit 26 and its pressure reduction orifice 28 into the upper end of the heat recovery region 20 of the saline water loop 10. There the newly admitted saline water mixes with saline water already in the loop and it passes downwardly with this water through the heat recovery region 20. During such passage the liquid saline water picks up heat from fresh water flowing up through the heat exchange jacket 52.

The heated saline water is then pumped by means of the saline water recirculating pump 34 up through the saline water return line 36 to the top of the column 14 where it is caused to flow down through the evaporator region 16. Partial evaporation takes place as above described as the water flows down through the evaporator region, so that both liquid water and vapor proceed out through the screen or grating 22 into the vapor region 18.

The vapor in the region 18 passes through the vapor transfer conduit 60 over to the fresh water loop 12. The unevaporated liquid however, falls down upon the baffle plates 24 and from there proceeds on down through the heat recovery region 20.

Since the water from the vapor region 18 contains the unvaporizable matter such as salts which were originally dissolved in the portion evaporated in the evaporator region 16, its salinity is higher than it was prior to its passage through the evaporator. Because of this, a portion of the unevaporated high salinity liquid is ejected out through the saline water discharge conduit 30 and is pumped up to atmospheric pressure by means of the saline discharge pump 32 for effective discharge. The amount of water thus discharged, and the amount of water admitted to the system via the intake conduit 26 is adjusted to keep the total amount of water in the system at a constant amount and at the same time to maintain a given degree of salinity.

Turning now to the fresh water loop 12, it will be seen that the fresh water recirculating pump 50 causes fresh water from the bottom of the column 38 to pass into and up through the heat exchange jacket 58 where it gives up heat to the saline water flowing down through the heat recovery region 20 of the saline water loop 10. The thus cooled fresh water then proceeds up through the fresh water return line 54 to the top of the column 38 where it is caused to flow down through the fresh water evaporator region 40.

As the fresh water passes down through the evaporator region 40, a portion of it becomes evaporated as explained in connection with the saline water evaporation region 16. Thus both vapor and unevaporated liquid proceed down through the screen or grate 48 and into the ingestor region 42. In the ingestor region the downwardly falling liquid water entraps both the evaporator region 40 and the vapor from the vapor transfer conduit 60 and forms bubbles of this vapor which are carried downwardly through the lower condenser region 44. Toward the bottom of the lower condenser region 44 the pressure of the surrounding liquid exceeds the vapor pressure of the vapor contained in the downwardly moving bubbles. This has the effect of squeezing the bubbles to a point at which they condense and form a part of the downwardly flowing liquid. This squeezing of the vapor bubbles tends to raise their temperature. However, such temperature increase is immediately accompanied by a transfer of heat to the surrounding liquid so that the liquid effectively extracts heat from and condenses the vapor. Since the bubbles are fully dispersed in the downwardly flowing liquid the heat produced in squeezing them is evenly and efficiently absorbed in the surrounding liquid. This heat may then be recovered by the incoming saline water in the lower heat recovery region 20 of the saline water loop 10. The excess fresh water produced by condensation of vapor from the vapor transfer conduit 60 is drawn off at the upper end of the heat exchange jacket 52 via the fresh water discharge line 56 and the fresh water discharge pump 58.

It will be noted that no heat transfer through condenser walls is required to achieve condensation in the above described system. Actually, depending upon the pressures used, the only energy required by the system is the energy needed to circulate the water, raise it through the required heads, and make up for incidental losses. All of this energy is supplied by the pumps 34 and 50.

In practice it is best to optimize the incoming saline water temperature in order to maximize the "ingestor ratio," i.e., the ratio of volume of vapor which can be entrapped and carried along a given volume of liquid. Since the discharged saline water is at the same temperature as the incoming saline water the incoming water may be preheated at least partially to any desired temperature by the discharged saline water.

Figure 2:
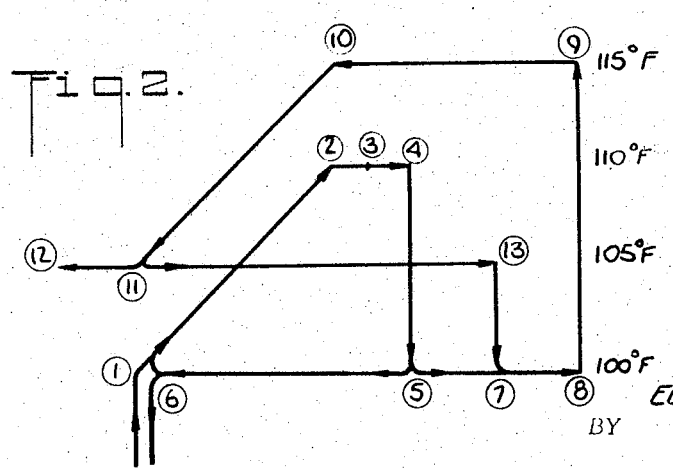
FIG. 2 is a line diagram useful in visualizing the changes in state undergone by various fluids as they flow through the system of FIG. 1.

The manner in which a system according to the present invention achieves solvent recovery with minimal energy expenditure can be visualized by reference to the line diagram of FIG. 2. This diagram represents an illustrative set of operating conditions for fluids passing through the system. In the diagram the encircled numerals represent the temperature of fluid in those regions of the system where their counterpart numerals are shown in FIG. 1. Thus at (1) saline water is taken into the system, for example, at 100° F., and is reduced in the intake orifice 28 to a pressure of about .970 p.s.i.a., close to its vapor pressure. In passing from (1) to (2) in the lower heat recovery region 20, the saline water absorbs heat from the fresh water in the heat exchange jacket 52, and attains a temperature of 110° F. At the same time, it passes down to the bottom of the column 14, and the weight of the liquid which it now supports causes its pressure now to reach a higher value. The liquid is then pumped by the saline water recirculating pump 34 up through the saline water recirculating line 36, undergoing a pressure decrease at a constant temperature from (3) to (4) so that at the top of the evaporator 16, it is near its vaporization point with a temperature of 110° F., and a pressure of about 1.275 p.s.i.a.

The saline water then passes through the evaporator 16 from (4) to (5) while a portion of it evaporates. Both the vapor and the liquid which flow out from the evaporator are at or close to the same conditions however, with a temperature of 100° F. and a pressure of 0.949 p.s.i.a. The unevaporated saline liquid falls down on the baffle plates 24 and moves smoothly into the stream of downwardly flowing liquid in the heat recovery column 20 without entrapping a significant amount of vapor in the process. As indicated at (6) a portion of this saline liquid is discharged.

As shown by point (5) on the diagram, the vaporized portion of the saline water separates and moves through the vapor transfer conduit 60 into the ingestor region 42 in the fresh water loop 12. As shown by point (7), this region also contains downwardly flowing liquid and vapor at a temperature of 100° F. and a pressure of 0.949 p.s.i.a. The vapor from the transfer conduit 60 mixes with the downwardly flowing liquid and vapor as indicated at (8) in the diagram. Because of the turbulence produced in the upper end of the condenser region 44 by the rapid downward movement of the liquid fresh water, all of the vapor in the region becomes entrapped in the liquid stream, and is carried down in the rapidly flowing liquid stream toward the fresh water recirculating pump 50. During this movemnt the vapors are pressure condensed and the temperature of the entire stream is raised to 115° F. as indicated at (9) on the diagram. The heated fresh water is transferred as indicated at (10) to the heat exchange jacket 52 where it gives up some of its heat to the saline water and in the process undergoes a temperature reduction to 105° F. as indicated at (11) in the diagram. A portion of this condensed and cooled fresh water is extracted from the system as indicated at (12) while the remainder is returned to the top of the upper fresh water evaporator region 40 as indicated at (13). Here the pressure of the fresh water is reduced to about 1.102 p.s.i.a. so that it is near its vaporization point. The water then passes down through the upper fresh water evaporation region 40 where a portion of it becomes evaporated and the resulting liquid and vapor, as indicated at point (7) on the diagram are at the same temperature and pressure as the vapor which joins with it from the saline water loop 10.

As stated previously, the liquid water which drops down from the saline evaporator region 16 is intercepted by the baffle plates 24 which serve to break its fall so that it flows smoothly and gently into the downwardly flowing liquid stream in the lower heat recovery column 20. As a result of this, little or no vapors become entrapped or ingested into the liquid stream. In the fresh water loop 12 however, the liquid which drops from the evaporator region 40 moves at high velocity and splashes into the column of downwardly flowing liquid in the condenser region 44. The splashing and turbulence thus produced causes a foaming action whereby the vapors in the ingestor region 42 become entrapped first by liquid films in the form of bubbles and thereafter the bubbles become fully submerged. The basic entrapment action is illustrated in simplified form in the sequence of FIGS. 3-6. As shown in FIG. 3, a drop 70 of liquid falls under the influence of gravity toward a liquid surface 72. The drop 70, during its fall, is surrounded by or immersed in a vapor atmosphere 74. As the drop 70 impinges upon the liquid surface 72, a crater 76 is formed in the surface; and this crater is ringed with an upwardly protruding lip 78. Meanwhile the drop 70 continues to penetrate the liquid surface 72 and to merge with it as shown in FIG. 5. As the drop becomes absorbed in the liquid, the lips 78 ringing the crater 76 are thrown upwardly and toward the crater axis, as shown in FIG. 5. Eventually these lips close upon each other and fall back to the remainder of the liquid. However, in so closing, they engulf a portion of the vapor 74 and form a bubble 80 (FIG. 6) which then becomes carried down in the rapidly flowing liquid stream.

Actually, this bubble forming process takes place very rapidly and at a great many locations simultaneously about the ingestor region 42 so that what is seen is a foaming action of such turbulence and magnitude as to occupy a considerable vertical height within the column 38. The foaming action is illustrated in FIG. 7. As there shown liquid rains out from the screen or grate 48 and down through the ingestor region 42 in the form of drops 70. These drops fall in great number and at high velocities so that they agitate the upper surface of the liquid in the condenser region 44. This agitation is actually a very highly intensified development of the single drop action described above; and it results in a foaming action in the ingestor region 42. The foam produced in this region is actually a transition between the upper portion of the ingestor region, wherein discrete liquid drops exist in a vapor environment, and the lower portion of the ingestor region, where discrete vapor bubbles exist in a liquid environment.

The liquid is caused to flow down through the ingestor region at a volumetric rate sufficient to require a very rapid downward velocity of flow of liquid in the condenser region 44 to maintain a constant level of liquid therein. This downward velocity must be high enough to overcome the upward velocity of the vapor bubbles produced by their buoyancy. By maintaining this rate of downward flow the bubbles are carried downward. They experience greater pressure and become denser and smaller and consequently less buoyant. Eventually they become compressed to a degree such that they liquefy. In undergoing compression during their downward movement, the vapor bubbles tend to rise in temperature according to the General Gas Law. This temperature rise permits heat (heat of vaporiaztion) to flow directly into the surrounding liquid. With the heat of vaporization thus extracted, the vapor condenses in mixture with the liquid water. It will be appreciated that the condensation and accompanying heat transfer are incrementally distributed along the length of the condenser region 44. This avoids sudden and severe energy flows and, as indicated previously, has been found to be far more efficient from a thermodynamic standpoint than prior known systems.

It has been found that rather large amounts of vapor may be condensed in the above described manner. Further, while it may at first be expected that the downward driving of liquid drops into the foam in the ingestor region would tend to break up as many bubbles as it forms, this is not the case. Actually the kinetic energy of the liquid drops is converted to pressure as they are stopped by the foam. This pressure tends to condense the vapor in the bubbles. It has been found that because the bubbles are immersed in a vapor atmosphere, their surface strength is far greater than it would be if they were immersed in a gaseous atmosphere such a air. Further, as the bubbles become compressed within the liquid their surface tension force increases very sharply causing them to collapse and condense in a very definite and positive manner. This has the effect of squeezing the bubbles to a point at which they condense and form a part of the downwardly flowing liquid. The squeezing of the vapor bubbles does have the effect of raising their temperature. However, the pressure on them increases at an even faster rate so that they do in fact become condensed. Since the bubbles are fully dispersed in the downwardly flowing liquid, the heat produced in squeezing them is immediately and evenly absorbed in the surrounding liquid. This heat may then be recovered by the incoming saline water in the lower heat recovery region 20 of the saline water loop 10. The excess fresh water produced by condensation of vapor from the vapor transfer conduit 60 is drawn off at the upper end of the heat exchange jacket 52 via the fresh water discharge line 56 and the fresh water discharge pump 58.

While the system described above operates at sub-atmospheric pressure, this is not a necessary requirement of the invention; and the system may be designed to operate in the vicinity of or even above atmospheric pressure. Since, however, heat energy to heat incoming saline water to 100 degrees is readily and inexpensively available, it is often practical to adjust the pressure values to coincide with these temperatures.

The temperature and pressure values can be adjusted such that maximum amounts of vapor will be ingested and condensed with a minimum flow of fresh water. This reduces the size of the capital equipment required for a given capacity; and it further reduces the amount of pumping required for each gallon of fresh water recovered.

While the vapor condensation system of the present invention has been described in connection with evaporator systems incorporating the principles of certain listed patents, nevertheless it will readily be appreciated by those skilled in the art that the broader aspects of this invention are not dependent upon these particular evaporators. Actually, the present invention will achieve recovery of moisture in liquid form from any external vapor source.

Having thus described the invention with particular reference to the preferred forms thereof, it will be obvious to those skilled in the art to which the invention pertains, after understanding the invention, that various other changes and modifications may be made therein without departing from the spirit and scope of the invention, as defined by the claims appended hereto.

What is claimed as new and desired to be secured by Letters Patent is:

1. A method for obtaining fresh water from a saline solution, said method comprising the steps of heating said saline solution, thereafter subjecting said saline solution to a decrease in pressure to allow vaporization of a portion thereof by obtaining its heat of vaporization from the sensible heat of the remaining unevaporated portion thereby reducing the temperature of the unevaporated portion, causing fresh water to flow rapidly downward in a column, transferring the vapors thus formed to the upper end of said downwardly flowing column of fresh water and ingesting said vapors as bubbles in the fresh water to be carried downwardly and subjected to a gradual yet continuous increase in pressure by the fresh water, the pressure increase produced by the fresh water tending to raise the temperature of the vapors in each bubble and allow their heat of vaporization to be returned gradually and evenly to the surrounding fresh water as sensible heat to raise its temperature and passing the so heated fresh water into sensible heat exchange relationship with the incoming saline solution to achieve said heating.

2. A method as in claim 1 wherein said fresh water is continuously recirculated, and a portion of the fresh water is extracted corresponding to the amount of vapors condensed thereby.

3. A method as in claim 1 wherein said fresh water is maintained at substantially the same pressure and temperature as said vapors at their point of ingestion.

4. A method as in claim 1 wherein said fresh water is subjected to partial evaporation by pressure reduction in advance of the point of ingestion of said vapors.

5. A method as in claim 1 wherein said saline water is subjected to a gradual decrease in pressure to produce a diffused evaporation of water therefrom.

6. A method as in claim 1 wherein said fresh water is heated by the compression of said vapors to a temperature greater than that of the saline solution.

(References on following page)

References Cited

UNITED STATES PATENTS

| | | | |
|---|---|---|---|
| 2,803,589 | 8/1957 | Thomas | 203—88 X |
| 3,288,686 | 11/1966 | Othmer | 203—11 |
| 3,312,601 | 4/1967 | Wilson et al. | 203—10 X |
| 3,394,055 | 7/1968 | Ludwig | 203—10 |
| 677,845 | 7/1901 | Coleman | 202—185.2 |
| 1,874,621 | 8/1932 | Randel | 62—483 |
| 1,882,254 | 10/1932 | Randel | 62—483 |
| 3,206,380 | 9/1965 | Daviau | 203—11 X |
| 2,696,465 | 12/1954 | Kittredge | 202—185 |
| 2,759,882 | 8/1956 | Worthen et al. | 203—11 |
| 2,764,533 | 9/1956 | Oetjen et al. | 203—80 |
| 3,206,379 | 9/1965 | Hill | 203—10 |
| 3,212,999 | 10/1965 | Sommers | 203—10 X |
| 3,214,348 | 10/1965 | Lichtenstein | 203—10 |
| 3,214,349 | 10/1965 | Kehoe et al. | 203—11 |
| 3,232,847 | 2/1966 | Hoff | 203—10 X |
| 3,275,529 | 9/1966 | Kehoe et al. | 203—10 X |
| 3,298,932 | 1/1967 | Bauer | 203—11 |

FOREIGN PATENTS 503,136    7///1930    Germany.

NORMAN YUDKOFF, *Primary Examiner.*

E. E. DRUMMOND, *Assistant Examiner.*

U.S. Cl. X.R.

202—185; 203—90, 100